Sept. 11, 1923.

W. O. OWEN

CRANK FOR WINDING SPOOLS, ETC

Filed Aug. 19, 1922

1,467,736

Patented Sept. 11, 1923.

1,467,736

UNITED STATES PATENT OFFICE.

WILLIAM O. OWEN, OF WASHINGTON, DISTRICT OF COLUMBIA.

CRANK FOR WINDING SPOOLS, ETC.

Application filed August 19, 1922. Serial No. 583,064.

*To all whom it may concern:*

Be it known that I, WILLIAM O. OWEN, a citizen of the United States, residing at Washington, District of Columbia, have invented certain new and useful Improvements in Cranks for Winding Spools, Etc., of which the following is a specification.

This invention relates to machine elements and has special reference to a crank. More particularly the invention relates to a crank for motion picture film rolls. In taking motion pictures it is common to put a film upon spools which are surrounded by light tight casing so that the unexposed film cannot be light struck. This casing consists of 2 members which surround the spool and have rotative motion relative to each other, the members being provided with slots which may be brought into and moved out of registry. The motion picture film is of highly elastic substance and to accomplish the winding of this film from a large reel on the small spools which are used in the small machines for the individual making of films for amateurs, is a very difficult matter as the film constantly tends to spring off the spool. Even after the film is wound it is difficult to hold the film in position while inserting it in the light proof casing. Consequently most users of these small machines buy the film already wound on these spools and in the casing. This adds materially to the expense. As a matter of fact, the film can be bought on large reels at a cost per foot not to exceed ⅔ of the cost per foot of the film when bought on the small spools.

The principal object of the present invention is to provide a simple inexpensive crank which may be attached readily to the spool of a motion picture film reel and which will enable the person using the same to quickly and easily wind off the large spool the proper quantity of film to fill the small spool.

Another object of the invention is to provide a crank for these small spools which will be frictionally connected thereto so that when a certain amount of the film is wound on the spool resistance to further winding will cause slipping of the crank rather than tearing of the film.

With the foregoing objects in view the invention consists in general of a simple crank of novel construction particularly adapted for use in connection with small moving picture film spools.

In the accompanying drawings, like characters of reference indicate like parts in the several views, and:—

Figure 1:
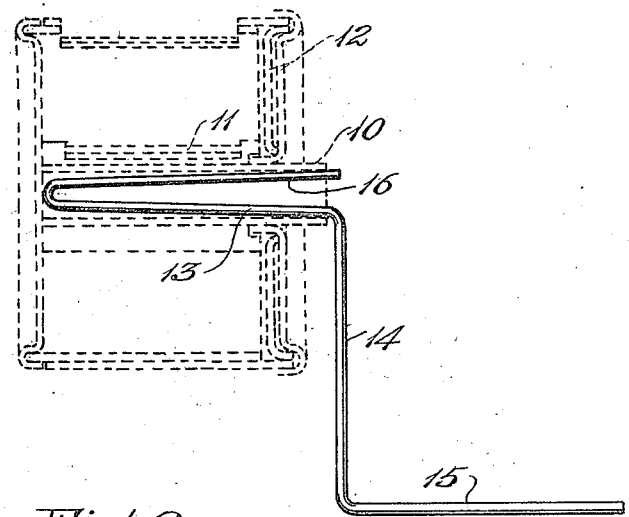
Figure 1 is an enlarged side view of the device showing the same applied to one of the small moving picture spools or reels, the latter being also enlarged to correspond with the enlargement of the invention itself.
Figure 2:
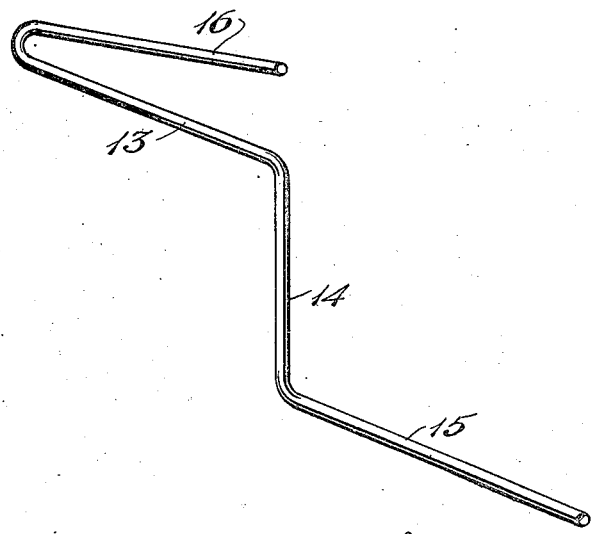
Figure 2 is a perspective view of the device removed from the spool.

In the accompanying drawings, there is disclosed in light dotted lines one of the spools or reels used for holding from 15 to 20 feet of motion picture film. This spool or reel consists of a central core, or spool proper in the form of a hollow tube 10 having a slot 11 therein for the reception of one end of the film. This spool proper is mounted in light tight bearings in a two part casing 11, these parts having slots movable into and out of registry as indicated at 12.

The invention itself consists of a single length of light spring steel or brass wire which is bent at, say, the middle to provide two end portions extending at right angles to each other, adjacent the point of bending as indicated at 13 and 14. One of these end portions is bent to provide a handle portion 15 which lies parallel to the portion 13 and at right angles to the portion 14. The other end portion is bent back upon itself as at 16 to lie in diverging relation to the adjacent portion 13.

In operation it is merely necessary to force the portion 13 and 16 into the hollow core or spool proper 10 when the crank will be in position for rotating the spool and consequently for winding the film thereon. One end of the film is then passed through the slots which are previously brought to registry and the film is wound on the spool until sufficient has been wound to fill the casing. When this takes place, the crank will slip and thus prevent tearing of the film. The casing is then rotated to bring the slots out of registry and the film severed from the main roll at a suitable distance from the casing. The crank can then be removed.

There has thus been provided a simple and efficient device of the kind described and for the purpose specified.

Having thus described the invention what is claimed as new, is:—

1. A crank of the class described having one end edapted to fit within a hollow shaft and provided with a spring means integral therewith for frictionally engaging the shaft to cause the same to rotate as the crank is rotated.

2. A crank formed of a single length of spring wire bent centrally to provide portions adjacent the bent portion to lie at right angles to each other, one end of the wire being bent to extend at right angles to one of said portions and parallel to the other, the remaining end of said wire being bent back upon the last mentioned portion to lie in diverging relation thereto and at an acute angle thereto.

In testimony whereof I affix my signature.

WILLIAM O. OWEN.